H. STANLEY.
Heating Stove.
No. 944. Reissued April 10, 1860.
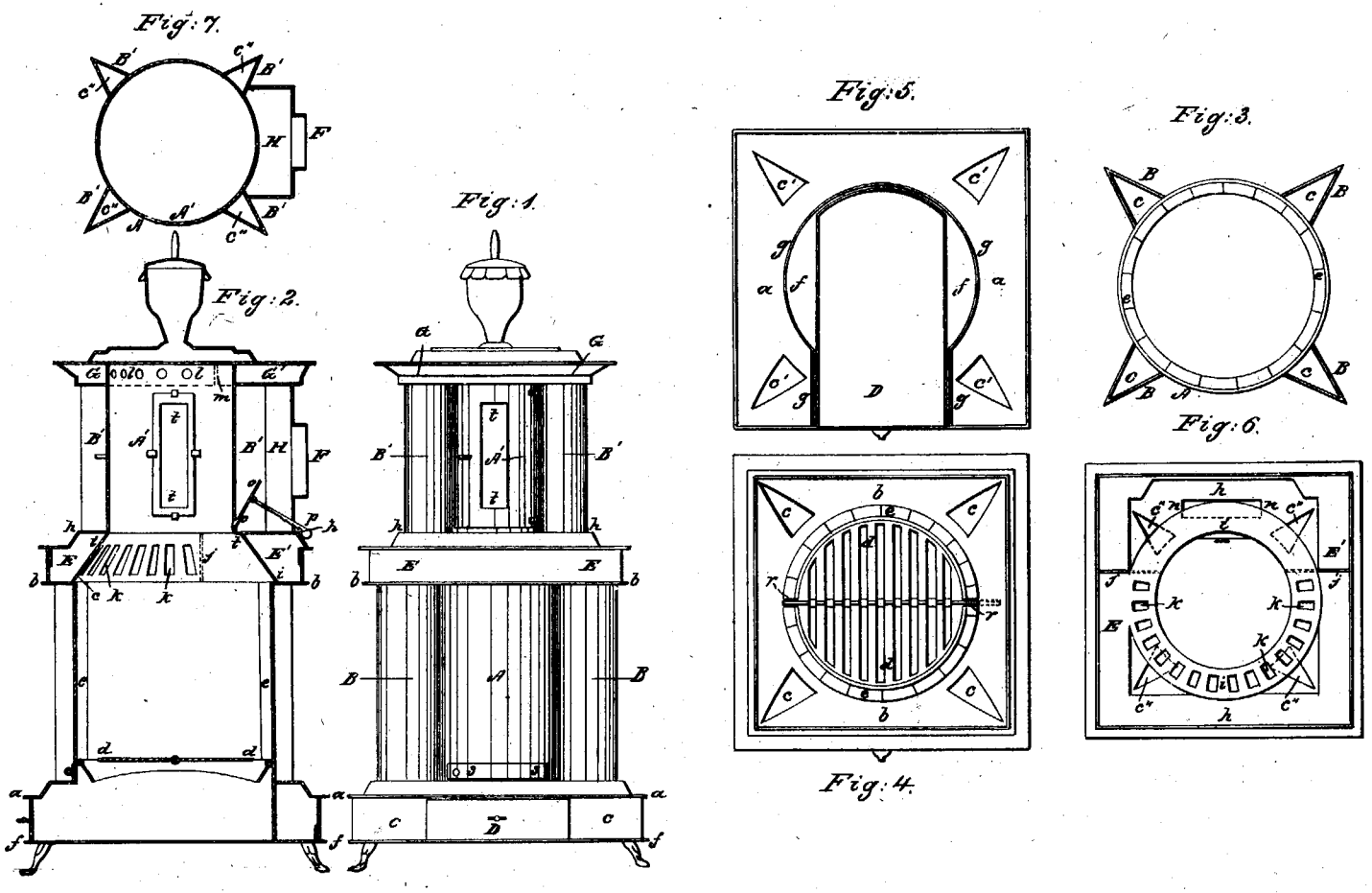
N. PETERS, Photo-Lithographer, Washington, D. C.

UNITED STATES PATENT OFFICE.

CHARLES EDDY AND JACOB SHAVOR, OF TROY, ASSIGNEE OF HENRY STANLEY, OF ALBANY, NEW YORK.

IMPROVEMENT IN COAL-STOVES.

Specification forming part of Letters Patent No. 3,876, dated January 4, 1845 Reissue No. 944, dated April 10, 1860.

*To all whom it may concern:*

Be it known that HENRY STANLEY, of Albany, in the county of Rensselaer and State of New York, did invent an Improvement in Coal-Stoves, of which the following is a specification.

In the drawings, Figure 1 is a front elevation of the coal-burner. Fig. 2 is a vertical section through the center from front to rear. Fig. 3 is a horizontal section through the fire-chamber. Fig. 4 is a horizontal section showing the grate of the fire-chamber. Fig. 5 is a horizontal section through the plinth, showing the ash-pit and drawer or ash-pan D; Fig. 6, horizontal section showing the conical grate *i* at the top of the fire-chamber, the view being taken from below looking up into the upper section.

The improvements consist in the construction and combination of the several parts, consisting of a chamber of combustion, surmounting chamber, and flues with a peculiar arrangement, and the connections therewith, by which the heat is more perfectly radiated and the fuel better economized than has been heretofore effected, the construction being cheap, durable, compact, and ornamental. The exterior of the coal-burner is composed of a square plinth elevated on four legs. On this the chamber of combustion rests, surmounted by a square cornice or abacus, on which a smaller cylinder is placed, forming an upper section or story. This last-named cylinder is capped with another cornice of proportionate dimensions. Four triangular columns (the exterior surface of which may be either flat or somewhat convexed) rise from the plinth to the abacus, and four similar ones, but of smaller dimensions, extend from the abacus to the upper cornice. The whole may be surmounted with an urn, thus harmonizing and perfecting the outline of the whole and forming a radiator of greatly-extended surface and compact form, in which the surfaces of radiation do not interfere or counteract each other.

The details of the interior are as follows: The center portion of the plinth has an ash-pit in it, into which the ash-pan D slides in front. This ash pit is separated from an exterior chamber, *a*, that surrounds three sides of it, as clearly represented in Fig. 5, the division being formed by the projection of the fire-cylinder A down through the top plate to the bottom plate of the plinth, as at *g*. The fire-cylinder A, forming the chamber of combustion, is lined with fire-brick from the plinth to the abacus E. (See *e*, Figs 2, 3.) At the top of cylinder A there is a cone-shaped ring, *i*, most clearly seen in Fig. 6, the base of which is just the diameter of the lower cylinder, its top being contracted to the size of the smaller upper cylinder, A′. The breadth of this ring is equal to the depth of the abacus E, in which it forms an annular chamber all around the heater. The anterior portion of this ring *i* is pierced with oblong apertures, forming a grating, *k*, for about two-thirds of its circumference, forming a communication between the chamber in E and the upper part of the fire-chamber. Just in the rear of this grating *k* there is a partition on each side at *j*, Figs. 2 and 6, dividing said chamber into two unequal parts. The triangular flues B, before spoken of, open at their upper ends into the chamber E and at their lower ends into the chamber in the plinth at *c′*, Figs. 4, 5, the front flues B, communicating with the front division of chamber E and the rear flues B opening into the rear portion of said chamber. The cone-grate *i* is intended for three most important purposes: First, it protects the chamber E and flues B against the entrance of coal or ashes, by which they would become clogged; secondly, the grating diffuses the heated products of combustion in entering the chamber E, and thus spreads out to the whole surface of the radiating-chamber E the heat from the fire before the gases descend to the plinth; and thirdly, it shields the outer surface of chamber E from the direct action of the heat from the coal in the fire-chamber, preventing their rapid destruction and the injurious effect upon the external atmosphere of the too highly heated iron.

In the front of cylinder A there is a draft port or opening directly opposite or a little above the grate, which latter is surrounded by a shell or conical ring descending below the draft-port. Most clearly seen at *x*, Fig. 2. The air enters the port *s*, impinges against the shell *x*, around which it circulates, and, in a diffused, heated state, descends under the shell all around the grate, and thence rises to supply air to the fire. The cylinder A′, which is entirely open to the lower cylinder at its bottom, has a grating surrounding the front portion of its top, communicating with the chamber in its cornice G, and this chamber is divided, as the chamber E, by plates *m*. (See Fig. 2.) The radiating corner flues, B′, open into the cornice G at top and into the abacus E below. The purpose of this arrangement is twofold: First, by means thereof the heat radiating surfaces are materially extended; and, secondly, the deleterious gases rising into this chamber A′ from the fuel are drawn off, descending into chamber E, and thence following the main current through flues B, and are thus prevented from entering the apartment. In the front of cylinder A′ there is a door through which the fuel is supplied to the fire, and in this door, as well as in the two sides of the cylinder, there is an open-work panel into which mica is inserted to show the fire. In the rear part of the top plate, *h*, of chamber E there is an opening, *n*, (see Fig. 6,) made of a proper size to insure a perfect draft. This opens into a chamber, H, formed in the rear of the cylinder A′. This has an opening and collar, F, for the attachment of a smoke-pipe, as in ordinary stoves. An opening is made from cylinder A′ directly into the chamber H, forming a direct draft to the exit-pipe at F, to be used in kindling the fire. This opening is governed and closed by a damper opening into the chamber H. This damper is lettered *o* in Fig. 2. It is moved by a stem, P, that projects through the back of chamber H. When the damper *o* is closed, the course of the draft is down the front flues, B B′, back along the side chambers of the plinth, thence up the back flues B into the chamber H, through the rear part of chamber E, the gases in the upper cylinder, A′, being drawn down by the current below.

Having thus fully described the improved combination for a coal-burner, what we claim as the invention of HENRY STANLEY is—

1. The combination of the grate *i* with the chamber E, substantially as and for the purposes set forth.

2. The upper section and flues, with the chamber E, or its equivalent, as and for the purposes specified.

3. The combination of the shell or projection *x* and the opening *s*, to diffuse and heat the air before it enters the combustion-chamber.

CHARLES EDDY.
JACOB SHAVOR.

Witnesses:
A. C. CORSE,
THOMAS WOOLCOCKS.